Nov. 18, 1952     C. D. ORSINI     2,618,019
METHOD OF MAKING VARIEGATED THERMOPLASTIC PANELS
Filed March 31, 1950     2 SHEETS—SHEET 1
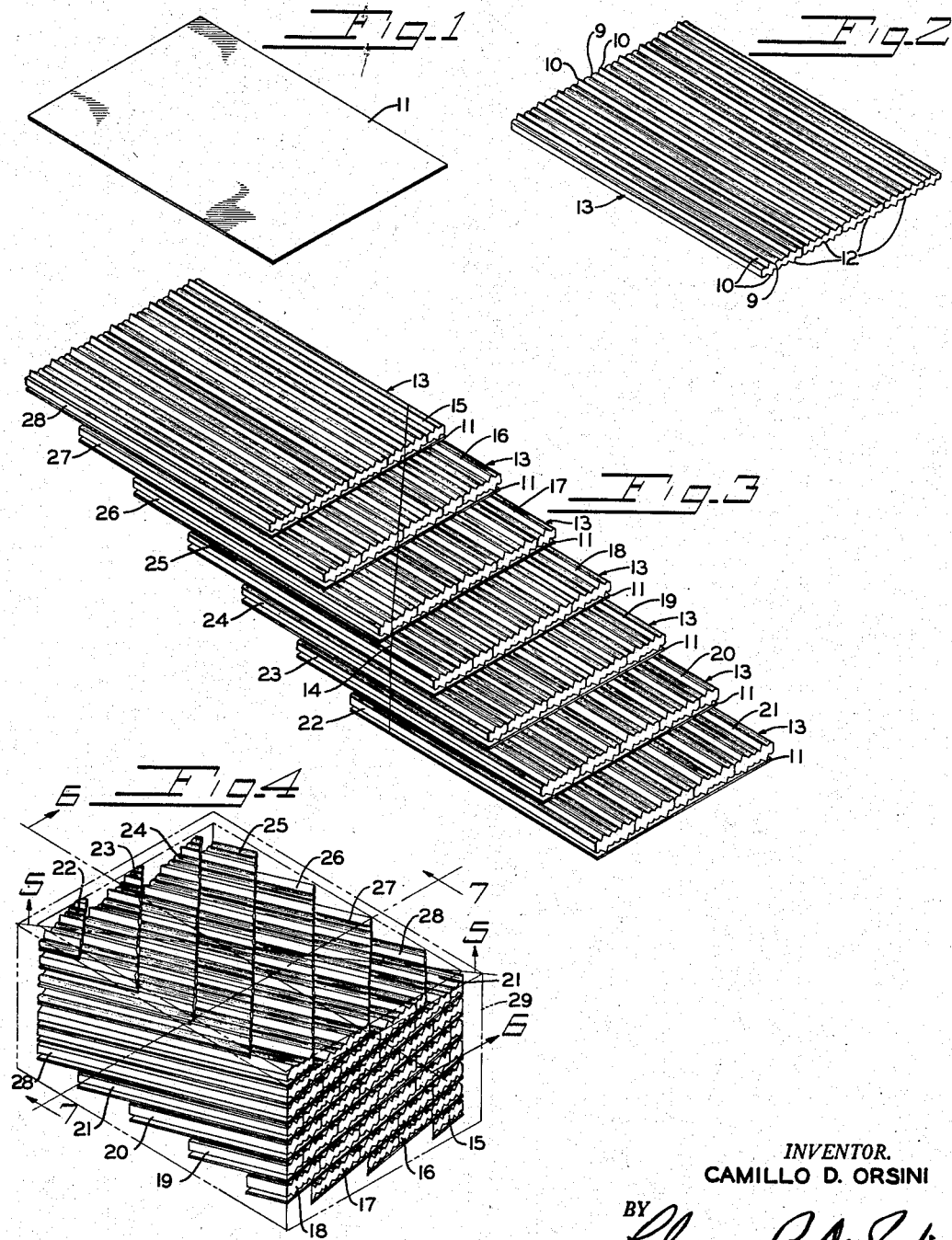
INVENTOR.
CAMILLO D. ORSINI
BY Clarence A. DesJardins
HIS ATTORNEY

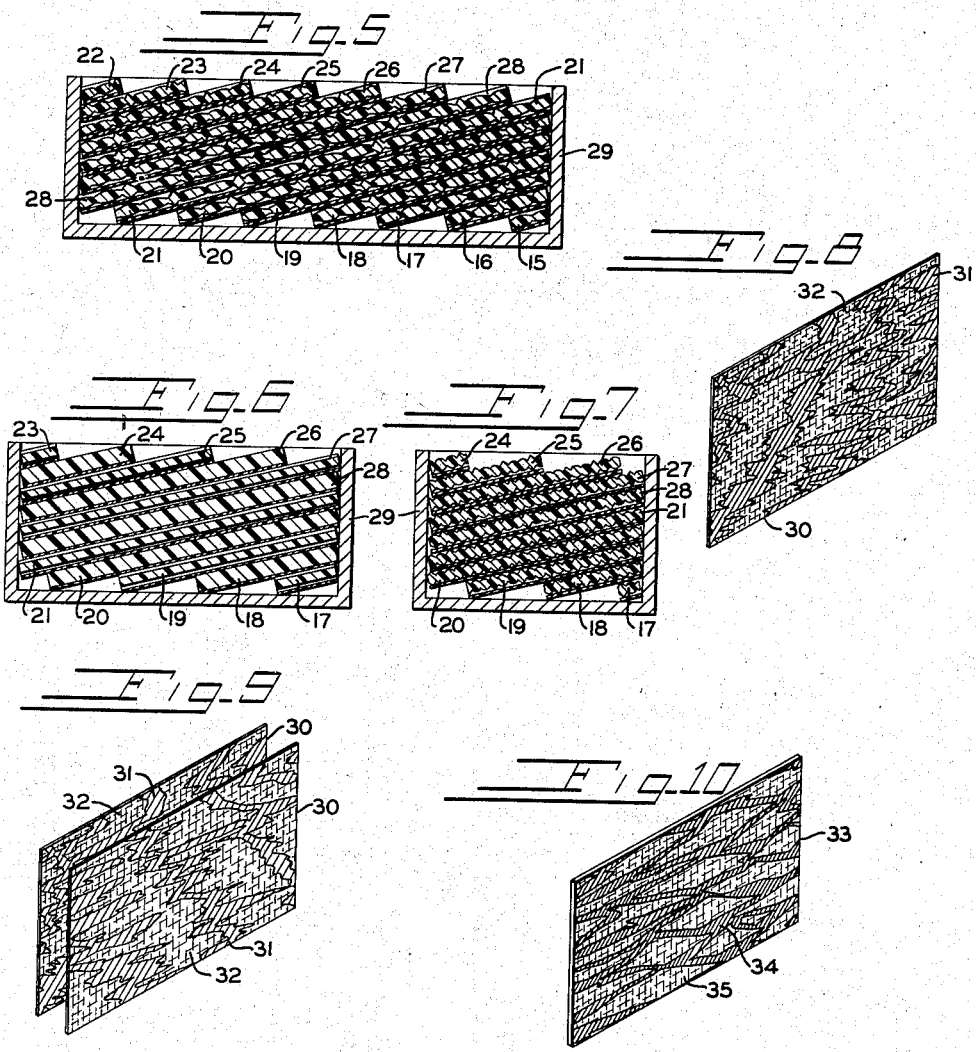

Patented Nov. 18, 1952

2,618,019

UNITED STATES PATENT OFFICE 2,618,019

METHOD OF MAKING VARIEGATED THERMOPLASTIC PANELS

Camillo D. Orsini, Highland Park, N. J., assignor to Nixon Nitration Works, Nixon, N. J., a corporation of New Jersey Application March 31, 1950, Serial No. 153,139

24 Claims. (Cl. 18—48.8)

My invention relates to an improved method of making variegated thermoplastic panels and has to do, more particularly, with an improved method of making thermoplastic panels of the type commonly known in the trade as tortoise shell or "demi-blonde."

Heretofore, the method of making tortoise shell or "demi-blonde" thermoplastic panels has consisted of forming a stack of plane-surfaced or flat panels of thermoplastic material, in which alternate panels are of like color and are interspersed with panels of contrasting color, subjecting said stack to heat and pressure to integrate it into a solid block, sheeting that block to form panels therefrom, forming another stack of said panels with adjacent panels reversed, subjecting the second stack to heat and pressure to form a solid block, sheeting that block to form another set of panels and continuing this process through as many as four pressing and sheeting operations until panels having the desired pattern have been formed. This old process has the disadvantage that it is long and expensive and the repeated pressing operations cause the material to lose most of the plasticizer, which gives it toughness and life, so that the resulting product is inferior in quality. Losses in labor, machine time and scrap are also disadvantages of this old process.

The principal object of my present invention is to provide an improved method of making such variegated thermoplastic panels, which is more economical and efficient than any process heretofore known, and which results in a saving of labor, machine time and scrap.

A further object of my invention is to provide a method of making variegated thermoplastic panels which results in an improved product, because the loss of plasticizer due to repeated pressing operations is eliminated.

Another object of my invention is to provide a method of making variegated thermoplastic panels which produces better panels, at a lower cost than any method heretofore known for the purpose.

Further objects, and objects relating to details and economies of operation, will definitely appear from the detailed description to follow. The improved method constituting my present invention is clearly defined in the appended claims. In one instance, I have accomplished the objects of my invention by the method described in the specification and illustrated in the accompanying drawings, in which:

Fig. 1 is a perspective view of one of the plane-surfaced or flat sheets of thermoplastic material used in this process.

Fig. 2 is a perspective view of a rib-surfaced layer formed by arranging a plurality of extruded rib-surfaced strips side-by-side.

Fig. 3 is a perspective view of a terraced assembly of alternate plane-surfaced sheets of thermoplastic interspersed with rib-surfaced layers thereof of contrasting color, the diagonal line along which the terraced assembly is cut in two sections being indicated.

Fig. 4 is a perspective view of a chase containing a stack of pieces of thermoplastic arranged in sloping layers in accordance with my invention.

Fig. 5 is a sectional view through the chase and stack taken on the line 5—5 of Fig. 4.

Fig. 6 is a sectional view through the chase and stack taken on the line 6—6 of Fig. 4.

Fig. 7 is a sectional view through the chase and stack taken on the line 7—7 of Fig. 4.

Fig. 8 is a perspective view of a panel sheeted from the solid block formed by subjecting the stack shown in Fig. 4 to heat and pressure.

Fig. 9 is a perspective view showing two of the panels, such as shown in Fig. 8, arranged in parallel relationship but reversed with respect to each other, and Fig. 10 is a perspective view of a panel formed by sheeting the block formed by subjecting a stack of panels, arranged as shown in Fig. 9, to heat and pressure.

In the drawings, the same reference numerals refer to the same parts throughout the several views, and the sectional views are taken looking in the direction of the arrows at the ends of the section lines.

Broadly considered, my invention consists of a method of making variegated thermoplastic panels including the steps of forming a stack of thermoplastic pieces arranged in parallel layers, of which alternate layers are alike in color and flat or plane-surfaced, and are interspersed with rib-surfaced layers of thermoplastic of a color contrasting with that of the alternate layers, subjecting said stack to heat and pressure to integrate it into a solid block and, then, sheeting the block to form panels therefrom. The rib-surfaced layers are preferably substantially thicker than the flat sheets or plane-surfaced layers. The solid block is preferably sheeted to form panels by cutting in planes parallel to an end wall of the block. The rib-surfaced layers may be formed by extruding rib-surfaced strips and arranging a plurality of said strips, side-by-side, to form a rib-surfaced layer. If a closer pattern or design in the finished panel is required, a series of the panels formed by the steps above described may be assembled to form a second stack with adjacent panels reversed, which stack is, then, formed into a solid block by heat and pressure and sheeted to form the finished panels.

Considered from another viewpoint, the improved method of my invention includes the steps of forming a stack of pieces of thermoplastic arranged in parallel layers, which slope laterally and longitudinally with respect to a horizontal plane defining the top of the stack, alternate layers being of like color and interspersed with layers of color contrasting with that of the alternate layers, subjecting the stack so formed to heat and pressure to integrate it into a solid block and then sheeting the block to form panels. This stack may have the external outline of a rectangular parallelepiped and the layers are arranged in the stack generally parallel to a plane including a diagonal of said parallelepiped and intersecting a side and an end thereof. The interspersed layers are preferably substantially thicker than the alternate layers and are preferably rib-surfaced, while the alternate layers are flat or plane-surfaced. The rib-surfaced layers may be formed by extruding rib-surfaced strips of thermoplastic and arranging a plurality of said strips, side-by-side, to form a rib-surfaced layer. The solid block formed by subjecting the stack to heat and pressure is preferably sheeted by cutting in planes parallel to an end wall thereof. If a closer pattern is desired, a series of panels formed from the steps above mentioned may be assembled to form a second stack with adjacent panels reversed with respect to each other, which second stack is then formed by heat and pressure into a solid block that is sheeted to form the finished panels.

My invention includes, also, as a convenient mode of forming the stack to be integrated into a solid block, the assembling in parallel layers of a plurality of rectangular pieces of thermoplastic material, alternate layers in the assembly being of like color and interspersed with layers of color contrasting therewith, displacing successive layers longitudinally to produce a terraced assembly of layers, which is then cut crosswise along a plane making an acute angle with the side edges of the layers, so as to form two groups of pieces of progressively varying size, each piece having a side and an end at right angles to each other and an inclined end wall formed by said cut. Said pieces are then arranged in layers in a chase having the internal form of a rectangular parallelepiped, the smallest piece being placed in a bottom corner of the chase with the side and end at right angles engaging a side and end of the chase. The next larger piece is then placed on the first piece, resting thereon and on the bottom of the chase, and the piece of next larger size is then placed on top of the second piece, and so on until the piece of largest size has been placed in the chase when pieces of progressively decreasing size are assembled on top thereof.

Referring to the numbered parts of the drawings, 11 indicates a flat or plane-surfaced sheet or panel of thermoplastic material, uniform in color and preferably dark. Such sheets may be formed in any desired way, for instance, by sheeting a block of thermoplastic material of uniform color by slicing or cutting in planes parallel to a top or side of the block.

The numeral 13 indicates generally a rib-surfaced layer of thermoplastic formed by assembling side-by-side a plurality of strips 12, having longitudinally extending ribs 10 on upper and lower surfaces and valleys 9 between the ribs. Such strips 12 may well be formed by extrusion through a die of suitable formation, the extruded strips being cooled, cut to length and then assembled side-by-side, as shown in Fig. 2, to form the rib-surfaced layer 13. The rib-surfaced layer 13 is substantially thicker than the plane-surfaced sheet 11, being several times the thickness of the latter. It is formed of thermoplastic of uniform color, preferably lighter in color than the thermoplastic of sheet 11.

A sheet 11 and a rib-surfaced layer 13 are assembled in parallel relation, as shown in Fig. 3, to form a layer pair, and a plurality of these layer pairs are piled one on top of the other with the ends of successive layer pairs displaced longitudinally to form the terraced assembly indicated in Fig. 3, which comprises alternate layers formed of the plane-surfaced sheets 11, interspersed with rib-surfaced layers 13. This terraced assembly is then cut along the vertical plane indicated at 14, which intersects the sides of the terraced assembly at acute angles. Such cutting results in the formation of two groups of pieces, each piece including a plane-surfaced layer 11 and a rib-surfaced layer 13. The pieces in each group are of progressively varying size but each piece has a side and an end at right angles to each other and an end wall or edge forming an acute angle with the side. The pieces of one group are designated 15, 16, 17, 18, 19, 20 and 21, and the pieces of the other group are designated 22, 23, 24, 25, 26, 27 and 28.

The purpose of forming such a terraced assembly and cutting it to form two groups of pieces, as described above, is to facilitate the formation of a stack of pieces of thermoplastic material arranged in parallel sloping layers, alternate layers being plane-surfaced and of one color, interspersed with rib-surfaced layers of a color contrasting therewith, the stack having the external outline of a rectangular parallelepiped. This stack is formed in the interior of a chase 29, shown in Fig. 4, the interior of which has the form of a rectangular parallelepiped. The stack is started by placing the piece 15 at the bottom of the chase, in one of the lower corners thereof, with the side and end of the piece at right angles to each other fitting against the side and end of the chase. The piece 16 is next placed on top of piece 15 with a portion thereof resting on the bottom of the chase, and then the piece 17 is similarly placed on top of piece 16, and so on, placing the pieces 18, 19, 20, 21, 28, 27, 26, 25, 24, 23 and 22, one upon the other, in the order named. When the chase 29 has been thus filled, there is formed therein a stack of pieces of thermoplastic material having the external outline of a rectangular parallelepiped and composed of a plurality of parallel layers sloping longitudinally and laterally and, in general, parallel to a plane including a diagonal from the upper corner to the opposite lower corner of the parallelepiped and intersecting a side and end thereof. Alternate layers in this stack are of plane-surfaced thermoplastic material of one color and they are interspersed with rib-surfaced layers of a contrasting color.

The stack of pieces of thermoplastic contained in the chase 29 is heated therein in any suitable manner and, while so heated, is subjected to pressure, as by means of the platen and an hydraulic press fitting in the open upper end of the chase 29. The temperature employed will depend upon the specifications of the thermoplastic and should be sufficient to cause it to flow. Upon thus subjecting the stack to heat and pressure, it is consolidated or integrated to form a solid block of thermoplastic material containing irregularly dispersed portions of contrasting color.

Upon cooling and setting, the block, which is in the form of a rectangular parallelepiped, is removed from the chase and sheeted by slicing or cutting the block in planes parallel to one end thereof to form panels 30 having irregularly disposed dark areas 31 and lighter areas 32.

If panels are desired having a closer pattern than that produced by the operations above described, a series of the panels 30 can be piled one upon the other in parallel horizontal layers, with adjacent panels reversed, as indicated in Fig. 9 where one panel is indicated by 30a and the reversed panel by 30b. The pile of panels thus formed is placed in a chase, in which it is subjected to heat and pressure to integrate it into a solid block, and this block is then sheeted by slicing or cutting in planes parallel to the end of the block to form the panels 33 having irregularly located dark areas 34 and light areas 35.

The variegated thermoplastic panels produced by the method described above have dark and light areas so dispersed as to produce a most satisfactory tortoise-shell or "demi-blonde" effect. Moreover, the panels are more satisfactory than those heretofore produced because the plasticizer has not been driven off by repeated heating and pressing operations. Furthermore, the number of operations required to produce tortoise-shell or "demi-blonde" panels has been considerably reduced, and the method is a cheaper, more efficient and more effective one than any heretofore known.

I am aware that the method herein described is susceptible of considerable variation without departing from the spirit of my invention and, therefore, my invention is claimed broadly, as indicated by the appended claims.

Having thus described my invention, what I claim as new and useful, and desire to secure by Letters Patent, is:

1. The method of making variegated thermoplastic panels comprising the steps of forming a stack of pieces of thermoplastic material arranged in parallel layers, alternate layers being of like color and plane-surfaced and interspersed with rib-surfaced layers of irregular thickness and of a color contrasting with that of the alternate layers, diagonally terracing the layers on the top and bottom sides of said stack, subjecting said stack to heat and pressure to integrate it into a solid block, and sheeting said block to form panels.

2. The method of claim 1 in which the rib-surfaced layers are substantially thicker than the plane-surfaced layers of color contrasting therewith.

3. The method of claim 2 in which the block is sheeted in planes parallel to an end wall thereof.

4. The method of claim 3 including the steps of assembling the panels to form a second stack with adjacent panels reversed, subjecting said second stack to heat and pressure to integrate it into a second solid block, and sheeting said second block to form the finished panels.

5. The method of claim 1 including the steps of extruding rib-surfaced strips of thermoplastic material and arranging a plurality of said extruded strips side-by-side to form each of said rib-surfaced layers.

6. The method of making variegated thermoplastic panels comprising the steps of forming a stack of pieces of thermoplastic arranged in parallel layers, alternate layers being of like color and interspersed with layers of color contrasting therewith, said layers sloping laterally and longitudinally with respect to a horizontal plane defining the top of said stack, diagonally terracing the layers on the top and bottom sides of said stack, subjecting said stack to heat and pressure to integrate it into a solid block, and sheeting said block to form panels.

7. The method of claim 6 in which the interspersed layers are substantially thicker than the alternate layers.

8. The method of claim 7 in which the alternate layers are plane-surfaced and the interspersed layers are rib-surfaced.

9. The method of claim 8 in which the block is sheeted in planes parallel to an end wall thereof.

10. The method of claim 9 including the steps of assembling the panels in parallel relationship to form a second stack with adjacent panels reversed, subjecting said second stack to heat and pressure to integrate it into a second solid block, and sheeting said second block to form the finished panels.

11. The method of claim 6 including the steps of extruding strips of thermoplasic material, and arranging a plurality of said extruded strips side-by-side to form each of said interspersed layers.

12. The method of making variegated thermoplastic panels comprising the steps of forming a stack of pieces of thermoplastic arranged in parallel layers, alternate layers being of like color and interspersed with layers of color contrasting therewith, said stack having the shape of a rectangular parallelepiped and said layers being parallel to a plane including a diagonal of said parallelepiped and intersecting a side and an end thereof, subjecting said stack to heat and pressure to integrate it into a solid block, and sheeting said block to form panels.

13. The method of claim 12 in which the interspersed layers are substantially thicker than the alternate layers.

14. The method of claim 13 in which the alternate layers are plane-surfaced and the interspersed layers are rib-surfaced.

15. The method of claim 14 in which the block is sheeted in planes parallel to an end wall thereof.

16. The method of claim 15 including the steps of assembling the panels in parallel relationship to form a second stack in which adjacent panels are reversed, subjecting said second stack to heat and pressure to integrate it into a second solid block, and sheeting said second block to form the finished panels.

17. The method of claim 12 including the steps of extruding strips of thermoplastic material, and arranging a plurality of said extruded strips side-by-side to form each of said interspersed layers.

18. The method of making variegated thermoplastic panels comprising the steps of assembling in parallel layers a plurality of rectangular pieces of thermoplastic material, alternate layers being of like color and interspersed with layers of color contrasting therewith, displacing successive layers longitudinally to produce a terraced assembly of layers, cutting said terraced assembly crosswise along a line making an acute angle with the side edges of the layers forming two groups of pieces of progressively varying area, each piece having a side and an end at right angles to each other and an inclined end wall formed by said cut, arranging said pieces in layers in a chase having the internal form of a rectangular parallelepiped with the smallest piece in a bottom corner of the chase with the side and end at right angles engaging a side and end of the chase, the piece next in size similarly arranged in the chase resting on the first piece and the bottom of the chase, and with pieces of progressively increasing size and then of progressively decreasing size assembled on the lower pieces in sloping layers until the chase is filled, subjecting the stack of sloping layers in said chase to heat and pressure to integrate it into a solid block, removing said block from the chase and sheeting it to form panels.

19. The method of claim 18 in which the assembly comprises pairs of layers, each pair including an alternate layer and an interspersed layer of contrasting color, and successive pairs of layers are offset longitudinally to produce the terraced assembly, and each piece cut therefrom includes two layers of contrasting color.

20. The method of claim 19 in which the interspersed layers are substantially thicker than the alternate layers.

21. The method of claim 20 in which the alternate layers are plane-surfaced and the interspersed layers are rib-surfaced and of irregular thickness.

22. The method of claim 21 including the steps of extruding strips of thermoplastic material, and arranging a plurality of said extruded strips side-by-side to form each of said interspersed layers.

23. The method of making variegated thermoplastic panels comprising the steps of forming a stack of pieces of thermoplastic material arranged in parallel layers, alternate layers being plane-surfaced and interposed with rib-surfaced layers of irregular thickness and of a color contrasting with that of the alternate layers, diagonally terracing the layers on the top and bottom sides of said stack, subjecting said stack to heat and pressure to integrate it into a solid block, and sheeting said block to form panels.

24. The method of making variegated thermoplastic panels comprising the steps of forming a stack of pieces of thermoplastic material arranged in parallel relation with the top and bottom surface of each layer facing the top and bottom of said stack and the ends of each of the layers facing the lateral sides of said stack, said pieces being of progressively decreasing area from the middle of said stack toward the top and bottom sides of said stack and having diagonal disposed butt ends for diagonally setting off the said top and bottom sides of the stack in diagonally terraced form, subjecting said stack to heat and pressure to integrate it into a solid block, and sheeting said block to form panels.

CAMILLO D. ORSINI.

REFERENCES CITED

The following references are of record in the file of this patent:

UNITED STATES PATENTS

| Number | Name | Date |
|---|---|---|
| 1,304,083 | Moore | May 20, 1919 |
| 1,434,157 | Shuster | Oct. 31, 1922 |
| 1,657,172 | Monroe | Jan. 24, 1928 |
| 1,675,642 | Clewell | July 3, 1928 |
| 1,685,355 | Ellis | Sept. 25, 1928 |
| 1,912,401 | Renouprez | June 6, 1933 |
| 2,017,705 | Sproxton | Oct. 15, 1935 |
| 2,093,652 | Widmer et al. | Sept. 21, 1937 |
| 2,102,747 | Roberts | Dec. 21, 1937 |

FOREIGN PATENTS

| Number | Country | Date |
|---|---|---|
| 617,266 | Great Britain | Feb. 3, 1949 |